US008332951B2

(12) United States Patent
Chakra et al.

(10) Patent No.: US 8,332,951 B2
(45) Date of Patent: *Dec. 11, 2012

(54) SECTION BASED SECURITY FOR A SECTIONED SURFACE-BASED COMPUTING DEVICE

(75) Inventors: Al Chakra, Apex, NC (US); Monica S. Harris, Wake Forest, NC (US); Ruthie D. Lyle, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 876 days.

This patent is subject to a terminal disclaimer.

(21) Appl. No.: 12/029,627

(22) Filed: Feb. 12, 2008

(65) Prior Publication Data
US 2009/0205049 A1 Aug. 13, 2009

(51) Int. Cl.
*G06F 7/04* (2006.01)
(52) U.S. Cl. ............... 726/26; 726/27; 718/1; 718/104; 709/226
(58) Field of Classification Search .............. 726/26, 726/27; 718/1, 104; 709/226
See application file for complete search history.

(56) References Cited

U.S. PATENT DOCUMENTS

| | | | | |
|---|---|---|---|---|
| 5,127,099 A * | 6/1992 | Zifferer et al. | ............... | 340/5.22 |
| 2003/0065676 A1* | 4/2003 | Gbadegesin et al. | ...... | 707/104.1 |
| 2003/0156119 A1* | 8/2003 | Bonadio | ............... | 345/589 |
| 2004/0158722 A1* | 8/2004 | Carpenter | ............... | 713/182 |
| 2006/0155667 A1* | 7/2006 | Tolba | ............... | 707/1 |
| 2006/0265711 A1* | 11/2006 | Bantz et al. | ............... | 718/1 |
| 2009/0055840 A1* | 2/2009 | Hieda | ............... | 719/319 |

OTHER PUBLICATIONS

Izadi (2003). Dynamo: A public interactive surface supporting the cooperative sharing and exchange of media. Retrieved from research.microsoft.com/pubs/132613/p159-izadi.pdf.*
Morris, Meredith Jun. 2006. Supporting effective interaction with tabletop groupware. Ph.D. dissertation, Stanford University, United States—California. Retrieved May 2, 2011, from Dissertations & Theses: Full Text.(Publication No. AAT 3219340).*
Derene, G., "Microsoft Surface: Behind-the-scenes First Look (with Video)", Popular Mechanics, Jul. 2007.

* cited by examiner

*Primary Examiner* — Jeffrey D Popham
*Assistant Examiner* — Brian Shaw
(74) *Attorney, Agent, or Firm* — Patents on Demand P.A.; Brian K. Buchheit; Scott M. Garrett

(57) ABSTRACT

The present invention discloses a method, a computer program product, a system, and a device for securing content of a surface-based computing device. In the invention, a delineated region of a surface of a surface-based computing device referred to as a section can be identified. The section can be a computing space owned by at least one user referred to as a section owner. Other regions of the surface exist that are computing spaces distinct from the section. A set of section specific settings can be established that are configurable by the section owner. An attempt to convey at least one software object across a section boundary separating the section from one of the other regions can be identified. The section specific settings can be applied to the attempt. Appropriate programmatic actions can be taken based upon the section specific settings.

20 Claims, 4 Drawing Sheets

SECTION BASED SECURITY FOR A SECTIONED SURFACE-BASED COMPUTING DEVICE

BACKGROUND OF THE INVENTION

The present invention relates to the field of surface-based computing and, more particularly, to section based security for a sectioned surface-based computing device.

Surface-based computing devices are a type of computing device in which a display is laid flat to simulate a table top. Surface-based computing devices employ the use of a multi-touch sensitive display to interact with the user. Because of the nature of a surface-based computing device's display, multiple users can interact with the computing device at once. Users can gather around the surface-based computing device's display and interact through its multi-touch interface and private user areas can be divided on the surface area for each user, as described in U.S. patent application Ser. No. 11/875,216 filed Oct. 19, 2007 and entitled "DIVIDING A SURFACE OF A SURFACE-BASED COMPUTING DEVICE INTO PRIVATE, USER-SPECIFIC AREAS". Each private user area can represent an independent computing session and/or a section of a common computing region that is specific to that user. Interactions can occur across boundaries of private user areas, such as passing documents across these boundaries so that other users can interact with content contained within a private user area. No know technique or solution exists for securing boundaries of a sectioned computing device, such as one having one or more private user areas.

Figure 1:
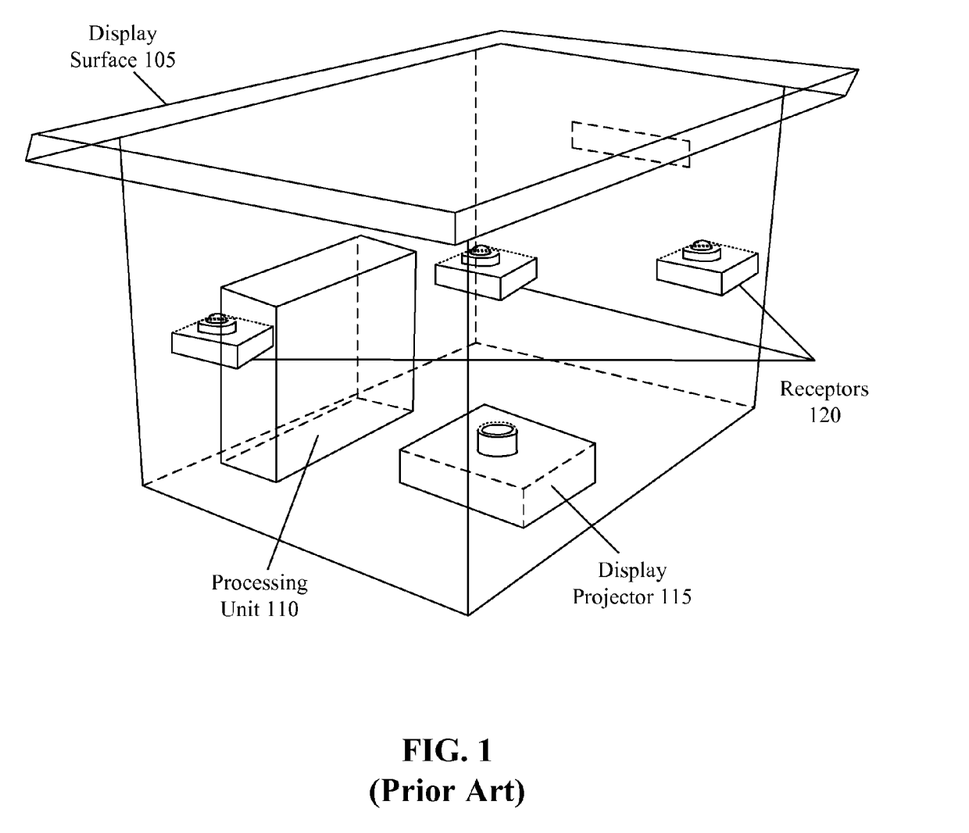
FIG. 1 (Prior Art) illustrates components of a surfaced based computing device.

FIG. 1 (Prior Art) illustrates components of a surfaced based computing device 100. The device 100 can include surface 105, computing device 110, display projector 115, and receptors 120. Processing unit 110 can contain one or more central processing units able to perform computing actions for the surface-based device 100. The processing unit 110 can include many of the same components found in everyday desktop computers, such a CPU, a motherboard, RAM, a graphics card, a WIFI transceiver, a BLUETOOTH transceiver, and the like.

The display surface 105 can be a horizontal surface that can incorporate multi-touch sensors. The touch-sensitive display can recognize objects by their shapes or by scanning tags (e.g., RFID tags) embedded in objects resting on the surface of display surface 105. The multi-touch display surface 105 can be capable of processing multiple inputs from multiple users.

Receptors 120 can detect motion/contact with the surface 105. For example, infrared light can be projected on the display surface 105 from below to be used for multiple touch sensing based upon changes in reflections detected by the receptors 120. A "machine vision" of the surface-based computing device 100 can operate in a near-infrared spectrum, such as by using an 850 nanometer-Wavelength LED light source aimed at the display surface 105. When objects touch the tabletop, the light reflects back and is picked up by multiple infrared cameras with an acceptable net resolution.

The display projector 115 can use rear-projection technologies, such as Digital light Processing (DLP) technologies, to project visible images to the display surface 105. A resolution of the visible screen can be different from the machine vision or invisible screen. For example, the visible screen can have a resolution of 1024×768, while the invisible resolution from the projectors 120 can be 1280×960, which can allow for better recognition at the edges of the display.

It should be appreciated that the components of the surface-based computing device 100 illustrate one possible variation only, and that other variations are to be considered within a definition of a surface-based computing device and within the scope of the present invention. For example, the surface 105 can utilize a thin film transistor liquid crystal display (TFT-LCD) technology and a resistive, capacitive, surface acoustic wave, etc. touch technology and still be considered a surface based computing device for present purposes.

BRIEF SUMMARY OF THE INVENTION

One aspect of the present invention can include a method, system, and computer program product for securing content of a surface-based computing device. In the aspect, a delineated region of a surface of a surface-based computing device referred to as a section can be identified. The section can be a computing space owned by at least one user referred to as a section owner. Other regions of the surface can exist, each being a computing space distinct from the section. A set of section specific settings can be established that are configurable by the section owner. An attempt to convey at least one software object across a section boundary separating the section from one of the other regions can be identified. The section specific settings can be applied to the attempt. Appropriate programmatic actions can be taken based upon the section specific settings.

Another aspect of the present invention can include a surface-based computing device that includes a section manager, a section security component, and a content exchange engine. The section manager can create, delete, and manage a set of sections for a surface-based computing device. Each section can be a delineated region of a surface of the surface-based computing device that is a distinct computing space owned by at least one user referred to as a section owner. The section security component can establish and enforce a set of section specific settings for sections handled by the section manager. The content exchange engine can selectively permit software objects to be conveyed into and out of each of the sections handled by the section manager. The section specific settings can be applied when attempts are made to convey the software objects across section boundaries.

DETAILED DESCRIPTION OF THE INVENTION

The present invention can allow for securing content by section on a sectioned surface-based computing device. More specifically, a configurable set of rules can be applied to each sectional boundary on a sectioned surface-based computing device. These configurable settings include security settings for individual content items, such as data files, images, music, video, or the like. These configurable settings can be applied to instances of running applications, where the instances are executing within specific sections of a sectioned surface-based computing device. In one embodiment, each section of the surface-based computing device can represent a private user area. Content can be shared across boundaries of these private user areas, where security permissions for shared content are controlled by a content "owner" and are defined within an original private user area. In one embodiment, these permissions can be applied to a conveyed software object, even after that object or a copy of that object has been conveyed beyond section based boundaries of the original private user area.

The present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. Examples of a computer-readable medium include a semiconductor or solid state memory, magnetic tape, a removable computer diskette, a random access memory (RAM), a read-only memory (ROM), an erasable programmable read-only memory (EPROM or Flash memory, a rigid magnetic disk and an optical disk. Current examples of optical disks include compact disk—read only memory (CD-ROM), compact disk—read/write (CD-R/W) and DVD. Other computer-readable medium can include a transmission media, such as those supporting the Internet, an intranet, a personal area network (PAN), or a magnetic storage device. Transmission media can include an electrical connection having one or more wires, an optical fiber, an optical storage device, and a defined segment of the electromagnet spectrum through which digitally encoded content is wirelessly conveyed using a carrier wave.

Note that the computer-usable or computer-readable medium can even include paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 2:
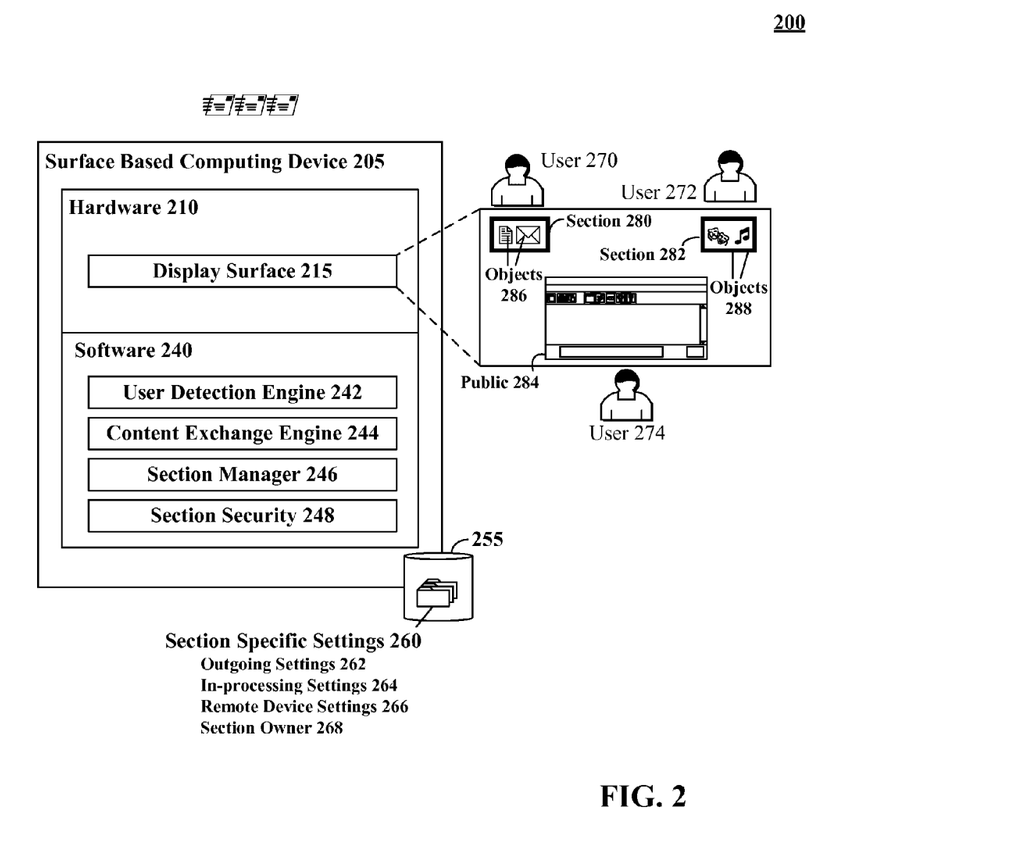
FIG. 2 is a schematic diagram of a system providing section based security for a surface-based computing device.

FIG. 2 is a schematic diagram of a system 200 providing section based security for a section-able surface-based computing device 205. The surface-based computing device can include a display surface 215, within which users 270-274 can establish user specific sections 280, 282. For example, after being authenticated for the surface-based computing device 205, user 270 could use his/her finger to draw a region, which section manager 246 defines as section 280. A section 280, 288 can represent a private computing space distinct from the public 284 computing space. One or more software objects 286, 288 can be present in a section 280, 288 and application instances can execute within a section 280, 288.

A section owner, who can be defined by a section owner parameter 268, can control and configure section specific settings 260 for that section 280, 282, where the settings 260 can be stored in data store 255. These section specific settings 260 can define a manner in which other users 270-274 are permitted to interact with the section 280, 282 and objects 286, 288 contained therein. The settings 260 can include outgoing settings 262, in-processing settings 264, remote device settings 266, and the like. In one embodiment, each user 270-274 can establish a user specific profile, which defines a set of default settings 260 for sections 280, 282, which that user 270-274 owns. These default settings 260 can, however, be overridden by settings specific to the section 280, 282.

Although sections 280, 282 are user 270-274 specific computing spaces included in surface 215 for interacting with the device 205, objects 286, 288 can be conveyed in and out of the section 280, 282 boundaries. For example, user 274 can "grab" an object 286 from section 280 and place it in the public region 284. In another example, user 272 can obtain a copy of a software object from the public region 284 and include it within section 282 as one of the objects 288. Users 270-274 other than a section owner can also be granted privileges to execute or view software objects 286, 288 included in a section 280, 282.

The outgoing settings 262 can specify permissions granted to non-section owners to obtain and/or utilize objects 286, 282 contained within a section 280, 282. Outgoing settings 262 can include read, write, delete, update, execute, copy, and the like. The outgoing permissions 262 can include restrictions against certain object 286, 288 types or categories, such as outgoing restrictions that only apply to music files or word processor documents. The outgoing settings 262 can also be applied to specific files or software objects 286, 288. Further, restrictions defined in the outgoing permissions can apply to semantic content of objects 286, 288. For example, objects 286, 288 containing information pertaining to a sensitive work project can be restricted to use within a section 280, 282, while objects 286, 288 are generally accessible outside their section 280, 282. Content sensitive outgoing settings 262 can even redact, hide, or encrypt sensitive content contained within an object 286, 288, while permitting non-sensitive content of the object 286, 288 to be utilized.

In-processing settings 264 can filter, process, or block objects, which others have attempted to insert into a protected section 286, 288. For example, the in-processing settings 264 can include "firewall-like" settings that restrict incoming objects 286, 288. For example, images greater than a defined size can be blocked by a section 280, 282 and/or can require explicit user permission (i.e., a user can be prompted to allow content otherwise blocked content to be conveyed into a section 280, 282) before being permitted.

The in-processing settings 264 can also manipulate or process incoming objects for use by a related user 270-274. For example, a user 270, who is owner of section 280, can be color blind and unable to distinguish between blue and green. In processing settings 264 for the section 280 can modify graphic, video, and application colors so that green changes to purple and blue changes to red. These manipulations can be performed by standard digital signal processing (DSP) operations.

In another example, a user 272, who is owner of section 282, can have poor eyesight and not be able to read text having a ten font size or less. The settings 264 can designate that software objects 288 contained into section 282 are to have a font size adjusted to a minimum of font twelve.

The remote device settings 266 can determine behavior of any device, which is managed or controlled by a section 280, 282. For example, a user 270 can connect a USB drive to a port of device, where drivers for interacting with the USB drive are handled by section 280. The device settings 266 for section 280 can thereafter determine what level of access users 272 and 274 have to content stored in the USB drive. In another example, user 272 can place a camera within section 282, which initiates a wireless connection between the camera and the device 205. Settings 266 associated with section 280 can determine whether other users 270, 274 can utilize functions of the camera, and if so can establish any level of restrictions for the camera's use.

In one embodiment, a section owner can change section 280, 282 specific settings 260, while other users 270-274 "possess" an object 286, 288 controlled by the settings 260. In one implementation, a programmatic linkage can be maintained between the original section 280 and the conveyed object, so that updated settings can be applied at any time. For example, original settings of section 280 can grant user 274 permission to copy a software object 286 to the public region 284, where it can be viewed by all. If user 270, who is the section owner of section 280, restricts view and copy permissions of the object 286 by making changes to the associated settings 260, the public copy of the object can "bounce back" to user 270 and a notification can be presented to users 272 and 274 that announces permissions on the object 286 have been revoked.

In another embodiment, revocations of previously granted permissions of section controlled software objects can be automatically applied whenever a related section 280 changes state. For example, section 280 or section 282 can be automatically disabled whenever an associated section owner (user 270, 272) leaves a proximity of surface 215, which can cause section specific privileges to be revoked until the section 280, 282 is re-enabled.

In one embodiment, granted permissions against a section controlled object 286, 288 can be revoked whenever a user 270-274 persistently attempts an operation against that object 286, 288 that is restricted by settings 260. For example, user 274 can be granted view access for object 288, but be denied a right to copy the software object 288 to a device external to device 205 (e.g., emailing the software object 288 as an attachment, copying the software object to an external drive, etc.). A first attempt by user 274 to copy the software object 288 can result in a warning being presented to the user 274 indicating that the user 274 has insufficient rights to that operation. A subsequent copy attempt, however, can result in the software object 288 being pulled back to section 282 and a notification of the repeated attempts to copy the software object 288 being presented to user 272.

The surface-based computing device 205 can include numerous hardware 210 and software 240 components. The hardware components 210 can include a display surface 215, a data store 255, a set of infrared projectors, a display projector, a processing unit, a tag scanner, a biometric reader, and/or other components.

The software 240 can include a user detection engine 242, a content exchange engine 244, a section manager 246, a section security component 248, and the like. The user detection engine 242 can detect a presence or absence of a user 270-274 about the surface 215. In one embodiment, engine 242 can detect when a user 270-272 controlling a section 280-282 leaves a proximity of the surface 215, which can result in that section 280-282 being temporarily disabled until a controlling user 270-272 returns.

The content exchange engine 250 can allow users 270-274 to share and interact with objects, such as through gestures detectable by device 205. Content exchange engine can enforce section specific settings 260, when attempts are made to exchange objects 286-288 across section 280, 282 boundaries.

The section manager 264 can permit sections 280, 282 to be created, destroyed, and maintained. The section security component 248 can permit users 270-276 to adjust settings 260 of sections 286, 288 that they control. The section security component 248 can also perform programmatic actions to ensure the settings 260 are applied to all device 205 interactions involving sections 280, 282. Additionally, the section security component 248 can monitor software object 286, 288 permissions and usages and can cause objects 286-288 to be "returned" to an owner and can cause suitable messages to be presented, whenever any user 270-274 attempts an operation that exceeds assigned rights.

As used herein, a section 280, 282 can be any user specific computing space of surface-based computing device 205. In one embodiment, the section 280, 282 can represent a distinct virtual machine, which utilizes virtualization technology to establish a distinct virtual computing device having its own instance of an operating system, which is distinct from an operating system instance used by a public region 284 of the device 205. In another embodiment, section 280, 282 can represent a sandboxed area having special restrictions applicable to only that section 280, 282. In one embodiment, a section 280, 282 can be owned, controlled by a group of users instead of just one individual user 270-274. In another embodiment, a protected storage space can be associated with each of the sections 280, 282, within which section objects 286, 288 are stored. The protected storage space can be implemented in a variety of manners, such as an encrypted folder, a virtual encrypted "drive", a distinct drive partition or physical drive, and the like.

Data store 255 can be physically implemented within any type of hardware including, but not limited to, a magnetic disk, an optical disk, a semiconductor memory, a digitally encoded plastic memory, a holographic memory, or any other recording medium. Data store 255 can be stand-alone storage units as well as a storage unit formed from a plurality of physical devices, which may be remotely located from one another. Additionally, information can be stored within the data store 255 in a variety of manners. For example, information can be stored within a database structure or can be stored within one or more files of a file storage system, where each file may or may not be indexed for information searching purposes. Additionally, encryption techniques can optionally protect content of data store 255.

Figure 3:
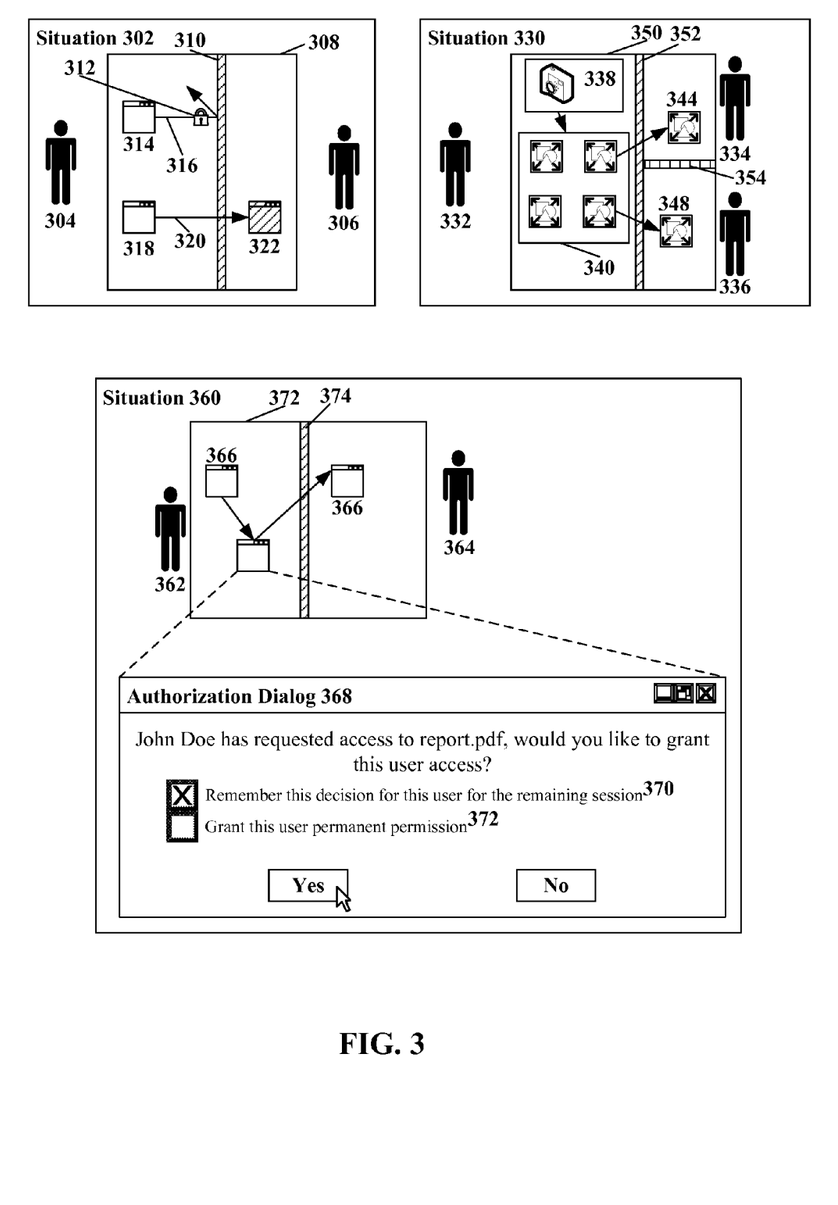
FIG. 3 illustrates example situations in which a surface-based computing device implements section based security measures In accordance with an embodiment of the inventive arrangements disclosed herein.

FIG. 3 illustrates example situations 302, 330, 360 in which a surface-based computing device implements section based security measures In accordance with an embodiment of the inventive arrangements disclosed herein. The example situations 302, 330, 360 can occur in context of system 200 or similar system.

In situation 302, users 304 and 306 can be interacting with surface-based computing device 308. A boundary 310 can exist between user 304 and user 306's independent work areas, at least one of which is a distinct user-specific section of the surface. Object 314 can be "flung" or moved over the boundary 310 and denied, as shown by movement 316. Lock 312 can be a visual indicator, such as an icon, to show that insufficient permissions exist to allow object 314 to be exchanged over boundary 310.

In the same situation 302, object 318 can pass along movement 320 over the boundary 310 and into the work area of user 306. As object 318 passes over boundary 310, it can become object 322. Object 322 can be a modified version of object 318, which has been processed in accordance with section specific settings (e.g., settings 260).

Situation 330 shows users 332-336 interacting with surface-based computing device 350. Boundaries 352 and 354 can exist to separate each users 332-336's personal work areas. Each boundary 352, 254 can have different permissions applied to effect the operation of exchanging objects between work areas.

In situation 330, user 332 can have mobile device 338 on surface-based computing device 350. Mobile device 338 can be configured to interface with computing device 350 and objects 340 can be accessed from device 338. In situation 330, user 332 can exchange of individual objects or all of the objects from objects 340 with users 334 and 336. Object 344 can be a version of a set of exchanged objects 340 conveyed to user 334's work space. Object 348 can be a version of a set of exchanged objects 340 conveyed to user 336's work space.

In situation 360, users 362 and 364 can interact with surface-based computing device 372. Boundary 374 can be a boundary that can exist to separate user 362 and 364's independent work spaces. Situation 360 can show the attempted exchange of object 366. Because of the permission settings applied to boundary 374, the exchange can cause the presentation of authorization dialog 368. Authorization dialog can request permission to exchange object 366 into user 364's work space. Authorization dialog can also include checkboxes 360 and 372. Checkbox 370 can allow for the granting of permission to this user for all exchanges for the rest of the current session. Checkbox 372 can allow the granting of permanent permission to this user. After access has been granted in authorization dialog 368, object 366 can be exchanged into user 364's work space. If permission is denied in authorization dialog 368 (not shown), object 366 can be returned to user 362's work space.

Figure 4:
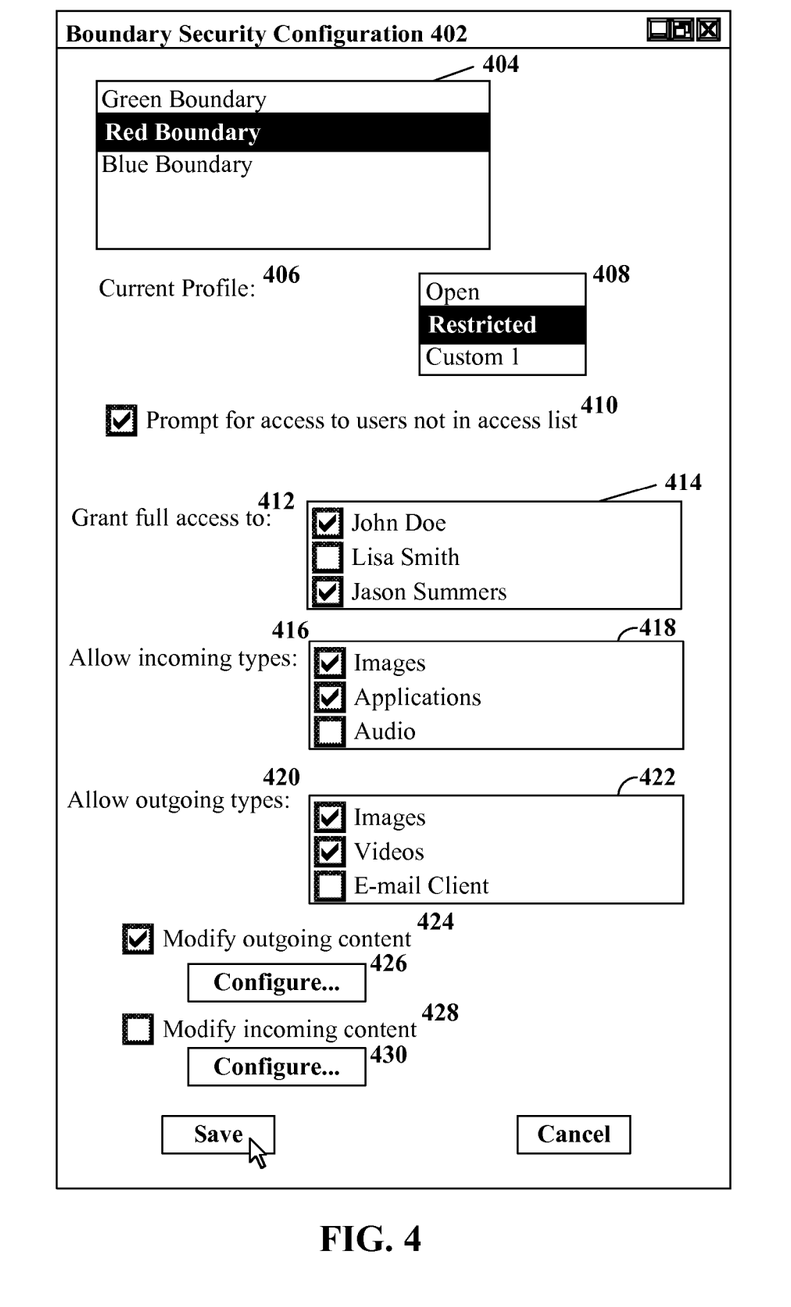
FIG. 4 shows an interface for configuring settings for securing content on a surface-based computing device when exchanging software objects across sectional boundaries in accordance with an embodiment of the inventive arrangements disclosed herein.

FIG. 4 shows an interface 402 for configuring settings for securing content on a surface-based computing device when exchanging software objects across sectional boundaries in accordance with an embodiment of the inventive arrangements disclosed herein.

Boundary security configuration interface 402 can be used to configure the permissions for exchanging objects on the divided display of a surface-based computing device. Option list 404 can allow the user to specify which boundary, or boundaries to apply the current settings to. Current profile 406 can be associated with control 408. Current profile 406 can allow the selection of a profile in which settings to apply. Using profiles can allow the quick switching of settings. Control 408 can allow the user to select a profile to load, or modify, to go along with current profile 406.

Checkbox 410, when enabled, can cause the content exchange engine to prompt the user when an object is being exchanged that isn't already granted permission. For example, an object is being exchanged to a user that isn't already in the full access list and that object is also not expressly granted permission in the object type list.

A grant full access to control 412 can be associated with control 414. Control 414 can allow the selection of users to allow access to all objects in the workspace. It is also contemplated, but not shown, that the user can select which permission has higher priority. For example, if a user is not on the full access list, but an object is being exchanged of an allowed type, a user can configure which permission to follow first.

Allow incoming types control 416 can be present in interface 402, which can be associated with control 418. Allow incoming types control 416 can be an option to always allow certain object types when they're being exchanged into the user's space. Control 418 can allow the user to select an object type or types to be associated with option 416.

Allow outgoing types control 420 can be an option to allow a user to configure certain object types to always allow when they're being exchanged from the current user space. Control 422 can allow the user to designate an object type or types to be associated with option 420.

Checkbox 424 can allow for the enablement of modifying outgoing content. When this option 424 is enabled, the object exchange engine can modify objects as they're exchanged out of the current user area. Configure control 426 can be associated with checkbox 424. Control 426 can begin a configuration process for modifying outgoing objects. It is contemplated that a user could configure options for modifying outgoing content to any level. Some examples can include, but are not limited to, removing a company's logo, blurring faces or objects in images, changing words in documents, or the like.

Checkbox 428 can allow the enablement of modifying incoming objects. Control 430 can be associated with checkbox 428 to allow the customization of how incoming objects would be modified. Control 430 can begin a configuration process, which can allow a user to configure options to any level. Some examples can include, but are not limited to, increasing the font size, replacing colors, censoring vulgar words or content, or the like.

Controls 404, 408, 410, 414, 418, 422, 424, and 428 can all be any GUI control with the ability to allow the customization of objects and able to perform the functionality described herein. These controls are not limited to those displayed and can allow for any kind of selection. Such controls can include, but are not limited to, a checkbox, a list box (single or multiple-select), a drop-down menu, a text edit control, or the like. Further, the present invention is not limited to those options shown within interface 402, which is presented to. The present invention can allow for customization to any level of detail.

The diagrams in FIGS. 2-4 illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for securing content of a surface-based computing device comprising:

identifying a plurality of delineated input/output regions of a surface of a surface-based computing device referred to as sections, wherein said surface is configured for concurrent usage by a plurality of different human beings, each utilizing a person-specific section of the surface to concurrently input/output content from the surface, wherein each of the sections is a computing space owned by a user referred to as a section owner, wherein other regions of the surface exist that are computing spaces distinct from each person-specific section, wherein each person-specific section and computing space is a virtual machine, wherein said virtual machine has its own operating system instance distinct from any operating system instance used by any of the other regions, wherein each section has a corresponding protected storage space within which files are stored, wherein users interact with the stored files through the corresponding section of a user interface of the surface based computing device, wherein inputs into each of the sections are processed by the surface-based computing device as coming from a corresponding user of the person-specific section, wherein the inputs result from touches to the surface of the surface-based computing device and not from an external mechanism linked to the surface-based computing device;

establishing a plurality of person-specific section specific settings configurable by the corresponding section owners, wherein said person-specific section specific settings apply to the files stored in the corresponding protected storage space, wherein one or more of the person-specific section specific settings prevents/permits a specific type of the files from being conveyed across a person-specific section specific boundary, said specific types of files of the person-specific section specific settings comprising at least: an image type, a video type, an audio type, and an application type for the files;

identifying an attempt by a user of the surface based computing device to access or manipulate one of the files of the protected storage space, wherein said attempt comprises a user interaction within the user interface that attempts to convey at least one software object representing one of the files across the person-specific section boundary separating said person-specific section from at least one of said other regions; and applying said person-specific section specific settings to the attempt to determine whether file-based permissions associated with the one file permit or disallow the attempted action and taking appropriate programmatic actions permitting or disallowing the attempted manipulation of the one file of the protected storage space in response to the attempt.

2. The method of claim 1, wherein said section specific settings comprise outgoing settings applied to all attempts to convey the software object of the person-specific section outside the person-specific section which corresponds to an attempt to access, and wherein said person-specific section specific settings comprise in-processing settings applied to all attempts to convey a software object located in a computing space external to the person-specific section inside the person-specific section.

3. The method of claim 1, further comprising:
determining a user profile for the section owner; and
setting values of the person-specific section specific settings applying to files of the protected storage space to values defined in the user profile for files of the protected storage space, wherein said person-specific section specific settings apply to interactions relating a plurality of software objects representing files associated with said section, when users other than said section owner attempt to interact with any of said plurality of software objects representing files associated with said person-specific section.

4. The method of claim 1, wherein the protected storage space is a storage space of the virtual machine or sandboxed computing space.

5. The method of claim 1, wherein at least one of said person-specific section specific settings comprise outgoing settings, wherein said outgoing settings define security settings for files represented by software objects of said person-specific section, wherein said outgoing settings define whether users of the surface-based computing device other than the section owner are able to utilize the files represented by the software objects.

6. The method of claim 5, wherein at least one of said person-specific section specific settings comprise view permissions, update permissions, and execute permissions to be applied to each of the files represented by software objects for interactions involving one of the other users and one of the files represented by one of the software objects.

7. The method of claim 5, wherein one outgoing setting prevents any of said software objects of the person-specific section from being conveyed across the person-specific section boundary, which in turn prevents any of the corresponding files of the protected storage space from being accessed from the user interface unless the access is through the person-specific section, wherein another one of the outgoing setting prevents a specified type of file represented by one of said software objects of the person-specific section from being conveyed across the person-specific section boundary, wherein another one of the outgoing setting prevents a specific file represented by a specific one of the software objects of the person-specific section from being conveyed across the person-specific section boundary.

8. The method of claim 5, wherein one outgoing setting prompts said section owner for permission each time another user of the surface-based computing device attempts to have one of the software objects of the person-specific section conveyed across said boundary thereby attempting to access one of the files of the protected storage space, wherein a granting of each of said attempts is conditional upon a response of the section owner to an associated one of said prompts.

9. The method of claim 1, wherein at least one of said person-specific section specific settings comprise remote device settings, wherein said remote device settings define security settings for remote devices associated specifically with said person-specific section, wherein said remote device settings define whether users of the surface-based computing device other than the section owner are able to utilize capabilities of the remote devices associated specifically with said section wherein the remote devices are associated with said person-specific section by controlling software drivers for interacting with the remote device using person-specific section specific permissions.

10. The method of claim 1, wherein at least one of said person-specific section specific settings comprise in-processing settings, wherein said in-processing settings define processing settings to be applied when attempts are made to convey software objects external to said person-specific section across said section boundary, wherein said person-specific section boundary determines whether files associated with corresponding software objects that are not stored in the protected storage space are to be manipulated through a portion of the user interface that is the person-specific section, wherein said in-processing settings define an incoming constraint that determines whether a conveyance of a software object across said boundary is permitted which thereafter places the corresponding file in the protected storage space.

11. The method of claim 10, further comprising:
detecting a presentation characteristic of one of said external software objects during one of said conveyance attempts; determining the detected presentation characteristic fails to satisfy a person-specific section specific presentation requirement defined by one of the in-processing settings;
executing a digital signal processing action against a file corresponding to the external software object, to modify the file stored outside the protected storage space so that it conforms to the presentation requirement; and
adding the software object representing the modified file in the person-specific section.

12. The method of claim 1, wherein the at least one software object is a visual representation of a file in the surface-based computing device having a set of access permissions, which include read, write, and execute permissions, wherein said person-specific section specific settings are established by the person-specific section specific settings, wherein the appropriate programmatic actions are consistent with the access permissions established by the person-specific section specific settings.

13. A computer program product for securing content of a surface based computing device, the computer program product comprising:

at least one non-transitory computer usable storage medium having computer usable program code embodied therewith, the computer usable program code comprising:

computer usable program code configured to identify a plurality of delineated input/output regions of a surface of a surface-based computing device referred to as sections, wherein said surface is configured for concurrent usage by a plurality of different human beings, each utilizing a person-specific section of the surface to concurrently input/output content from the surface, wherein each of the sections is a computing space owned by a user referred to as a section owner, wherein other regions of the surface exist that are computing spaces distinct from said person-specific section, wherein each person-specific section and computing space is a virtual machine, wherein said virtual machine has its own operating system instance distinct from any operating system instance used by any of the other regions, wherein each person-specific section has a corresponding protected storage space within which files are stored, wherein users interact with the stored files through the corresponding person-specific section of a user interface of the surface based computing device, wherein touch inputs on the surface within bounds of each of the sections are processed by the surface-based computing device as coming from a corresponding user of the person-specific section, wherein the touch inputs result from touches to the surface of the surface-based computing device and not from an external mechanism linked to the surface-based computing device;

computer usable program code configured to establish a plurality of person-specific section specific settings configurable by the corresponding section owners, wherein said person-specific section specific settings apply to files stored in the corresponding protected storage space, wherein specific ones of the settings apply to specific types of files and their conveyance across one of the person-specific section specific boundaries, wherein the specific types of files comprise at least: an image type, a video type, an audio type, and an application type;

computer usable program code configured to identify an attempt by a user of the surface based computing device to access or manipulate one of the files of the protected storage space, wherein said attempt comprises a user interaction within the user interface that attempts to convey at least one software object across the person-specific section boundary separating said person-specific section from at least one of said other regions; and computer usable program code configured to apply said person-specific section specific settings to the attempt to determine whether file-based permissions associated with the one file permit or disallow the attempted action and taking appropriate programmatic actions permitting or disallowing the attempted manipulation of the one file of the protected storage space in response to the attempt.

14. The computer program product of claim 13, wherein the protected storage space is a storage space of the virtual machine, wherein said person-specific section specific settings comprise outgoing settings applied to all attempts to convey the software object of the section outside the section which corresponds to an attempt to access, via the user interface of the surface based computer, one or more files of the protected storage space by a user other than the section owner, and wherein said person-specific section specific settings comprise in-processing settings applied to all attempts to convey a software object located in a computing space external to the person-specific section inside the person-specific section.

15. A surface-based computing device comprising:

a section manager configured to create, delete, and manage a plurality of person-specific sections for a surface-based computing device, wherein each person-specific section is a delineated input/output region of a surface of the surface-based computing device that is a distinct computing space owned by a corresponding user referred to as a section owner, wherein each person-specific section has a corresponding protected storage space within which files are stored, wherein touch inputs into each of the person-specific sections are processed by the surface-based computing device as coming from a corresponding user of the person-specific section when the touch input is entered within one of the person-specific sections, wherein the surface is configured for concurrent usage by a plurality of different human beings, wherein the touch inputs result from touches to the surface of the surface-based computing device and not from an external mechanism linked to the surface-based computing device;

a section security component configured to establish and enforce a plurality of person-specific section specific settings for sections handled by the section manager, which in turn provides security settings of the files in the protected storage space, wherein specific ones of the settings apply to specific types of files and their conveyance across one of the person-specific section specific boundaries, wherein the specific types of files comprise at least: an image type, a video type, an audio type, and an application type;

a content exchange engine configured to selectively permit software objects, each representing a file of a storage space of the surface based computing device, to be conveyed into and out of each of said person-specific sections handled by the section manager, wherein said person-specific section specific settings are applied when attempts are made to access files corresponding to software objects conveyed across person-specific section boundaries, wherein said surface-based computing device is a multi-touch sensitive display that concurrently interacts with a plurality of users via touch input; and a user detection engine configured to control a state of a section based on proximity of a section owner from the surface-based computing device, wherein the state comprises an enabled state and a disabled state.

16. The device of claim 15, wherein each person-specific section handled by the section manager comprises at least one of a virtual machine and a sandboxed computing space, wherein said virtual machine has its own operating system instance distinct from any operating system instance used by the surface-based computing device, wherein the protected storage space is a storage space of the virtual machine or sandboxed computing space.

17. The device of claim 15, further comprising: a data store comprising said plurality of person-specific section specific settings, wherein the person-specific section security component permits said section owners to configure said person-specific section specific settings.

18. The device of claim 17, said data store further comprising a plurality of user profiles, each user profile defining values of person-specific section specific settings that are to be applied as default settings for each person-specific section having a user associated with the user profile as a person-specific section owner.

19. The device of claim 15, wherein said person-specific section specific settings comprise outgoing settings applied to all attempts to convey software object of the person-specific section outside the person-specific section, and wherein said section specific settings comprise in-processing settings applied to all attempts to convey a software object located in a computing space external to the person-specific section inside the section.

20. The device of claim 15, wherein at least one of said person-specific section specific settings comprise remote device settings, wherein said remote device settings define security settings for remote devices associated specifically with an associated person-specific section, wherein said remote device settings define whether users of the surface-based computing device other than the person-specific section owner of the associated person-specific section are able to utilize capabilities of the remote devices.

* * * * *